(12) United States Patent
Mustan et al.

(10) Patent No.: US 11,969,080 B2
(45) Date of Patent: Apr. 30, 2024

(54) HANDLE ASSEMBLIES WITH OSCILLATOR ASSEMBLIES CONTAINED THEREIN AND TEETH CLEANING SYSTEMS THAT UTILIZE THE SAME

(71) Applicant: FENO LABS, INC., Wilmington, DE (US)

(72) Inventors: Rasvir Mustan, Olathe, KS (US); Andreas Singh Dierks, Copenhagen (DK); Daniel Stage Kristoffersen, Copenhagen (DK)

(73) Assignee: FENO LABS, INC., Wilmington, DE (US)

( * ) Notice: Subject to any disclaimer, the term of this patent is extended or adjusted under 35 U.S.C. 154(b) by 0 days.

(21) Appl. No.: 18/183,057

(22) Filed: Mar. 13, 2023

(65) Prior Publication Data

US 2023/0225495 A1 Jul. 20, 2023

Related U.S. Application Data

(63) Continuation of application No. 16/919,978, filed on Jul. 2, 2020, now Pat. No. 11,633,036.

(60) Provisional application No. 62/942,409, filed on Dec. 2, 2019.

(51) Int. Cl.
*A46B 9/04* (2006.01)
*A61C 17/22* (2006.01)
*A61C 17/34* (2006.01)

(52) U.S. Cl.
CPC ............ *A46B 9/045* (2013.01); *A61C 17/221* (2013.01); *A61C 17/222* (2013.01); *A61C 17/228* (2013.01); *A61C 17/3409* (2013.01)

(58) Field of Classification Search
CPC ..... A61C 17/20; A61C 17/228; A61C 17/222; A46B 9/045
See application file for complete search history.

(56) References Cited

U.S. PATENT DOCUMENTS

| | | | |
|---|---|---|---|
| 4,224,710 A | 9/1980 | Solow | |
| 6,353,956 B1 | 3/2002 | Berge | |
| 8,978,189 B1 | 3/2015 | Sexton | |
| 9,308,065 B2 * | 4/2016 | Steiner | ................ A61C 17/228 |
| 10,413,050 B2 | 9/2019 | Pierce et al. | |
| 2009/0276972 A1 | 11/2009 | Dugan | |

FOREIGN PATENT DOCUMENTS

| | | |
|---|---|---|
| JP | H1-68815 U | 1/1991 |
| JP | 2003144232 A | 12/2004 |
| KR | 101781631 B1 | 9/2017 |

(Continued)

*Primary Examiner* — Shay Karls
(74) *Attorney, Agent, or Firm* — Perkins Coie LLP; Andrew T. Pettit

(57) ABSTRACT

A teeth cleaning system, which provides improved coverage or brushing area. The system includes an actuated tray comprises brushing elements. The brushing elements may be positioned to engage the front, rear, and top surfaces of the upper and lower jaw teeth. The actuation may be configured to oscillate the tray in a lateral direction which may brush all the surfaces of teeth simultaneously. Some embodiments include a higher density of bristles which increases the effectiveness of brushing. In addition, aspects of the system reduce the time spent brushing teeth.

18 Claims, 20 Drawing Sheets

(56) References Cited

FOREIGN PATENT DOCUMENTS

KR      101866180 B1    6/2018
KR     1019118778 A    10/2019
WO      199602165 A1    2/1996

* cited by examiner

HANDLE ASSEMBLIES WITH OSCILLATOR ASSEMBLIES CONTAINED THEREIN AND TEETH CLEANING SYSTEMS THAT UTILIZE THE SAME

CROSS-REFERENCE TO RELATED APPLICATION(S)

This application is a continuation of U.S. patent application Ser. No. 16/919,978, filed Jul. 2, 2020, which claims the benefit of U.S. Provisional Application No. 62/942,409, filed Dec. 2, 2019, each of which is incorporated herein by reference in its entirety.

TECHNICAL FIELD

The subject disclosure relates to brushing, scrubbing, and general cleaning, and more particularly, to implements which concurrently brush plural tooth surfaces.

BACKGROUND

The field of teeth cleaning includes a number of approaches to brushing teeth. In the very basic, conventional approach is to provide a manually operated single brush head which the user applies to a single tooth or two overlapping teeth at a time until the user moves on.

Other approaches use electric powered toothbrushes in response to the ineffective approach of manual toothbrushes. Some electric toothbrushes power a single head in either a rotary motion (where the brush head spins) or in a reciprocating motion. Still, the single brush head approach requires time to apply the brush to each tooth.

Some devices have proposed multiple toothbrush heads but are limited in their effectiveness because of choice in the range of motion which for some is, for example, along an axis into and out of the user's mouth. As may be seen, this may be ineffective because the direction of brushing does not follow the front face of the front teeth, which are the teeth most visible to others. Still yet, the rear surface of the front teeth may likewise be generally missed by such an approach.

In some instances, conventional brushing devices lack enough bristles to adequately reach each tooth surface simultaneously.

As can be seen, there is a need for a device that improves the coverage of teeth and thereby reduces the amount of time it takes.

SUMMARY

In one aspect of the disclosure, a teeth cleaning system is disclosed. The system comprises: an arcuate tray configured to receive a set of teeth, wherein the tray includes: an inner arcuate wall, an outer arcuate wall, a baffle positioned transversely across between an inner surface of the outer arcuate wall and an inner surface of the inner arcuate wall and defining an upper channel for receiving teeth of an upper jaw and defining a lower channel for receiving teeth of a lower jaw, and a plurality of bristles positioned in the upper channel and in the lower channel; a handle; a connector, wherein the arcuate tray is coupled to the handle by the connector; a motor coupled to the handle; and an oscillator coupled to the connector, wherein the oscillator is configured to move the arcuate tray side-to-side along the same plane as the baffle in response to operation of the motor.

In another aspect of the disclosure, a teeth cleaning system is disclosed which, comprises: an arcuate tray configured to receive a set of teeth, wherein the tray includes: an inner arcuate wall, an outer arcuate wall, a baffle positioned transversely across between an inner surface of the outer arcuate wall and an inner surface of the inner arcuate wall and defining an upper channel for receiving teeth of an upper jaw and defining a lower channel for receiving teeth of a lower jaw, and a plurality of bristles positioned in the upper channel and in the lower channel, wherein the plurality of bristles comprises a density of between 324 bristles per $cm^2$—646 bristles per $cm^2$; a handle; a connector, wherein the arcuate tray is coupled to the handle by the connector; and a motor coupled to the handle, wherein operation of the motor brushes the teeth of the upper jaw and brushes the teeth of the lower jaw.

In yet another aspect of the disclosure a teeth cleaning system is disclosed which, comprises: an arcuate tray configured to receive a set of teeth, wherein the tray includes: an inner arcuate wall, an outer arcuate wall, a baffle positioned transversely across between an inner surface of the outer arcuate wall and an inner surface of the inner arcuate wall and defining an upper channel for receiving teeth of an upper jaw and defining a lower channel for receiving teeth of a lower jaw, and a plurality of bristles positioned in the upper channel and in the lower channel, wherein the plurality of bristles comprise a density between 324 bristles per $cm^2$—646 bristles per $cm^2$, herein a top surface of the baffle and a bottom surface of the baffle, the inner surface of the inner arcuate wall, and the inner surface of the outer arcuate wall each include a plurality of receptacles and wherein the plurality of bristles are positioned in bundles in respective receptacles; a handle; a connector, wherein the arcuate tray is coupled to the handle by the connector; a motor coupled to the handle, wherein operation of the motor brushes the teeth of the upper jaw and brushes the teeth of the lower jaw; and an oscillator coupled to the connector, wherein the oscillator is configured to move the arcuate tray side-to-side along a same plane as the baffle in response to operation of the motor.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, exemplary embodiments of the subject technology provide a cleaning system for teeth that provides improved coverage area and an improved range of motion to more effectively brush teeth with motorized actuation. It will be appreciated that, aspects of the system include an arrangement of bristles that provide greater bristle density than in previous systems. The greater density covers more tooth surfaces to be brushed. The system includes a motor to automatically actuate the brushing features. The system may automatically brush all tooth surfaces during operation. Another aspect contributing to the improved brushing performance includes the motion of actuation used in some embodiments. The system may be configured to actuate the brushing in a side-to-side range of movement, which may be more natural to users.

Figure 1:
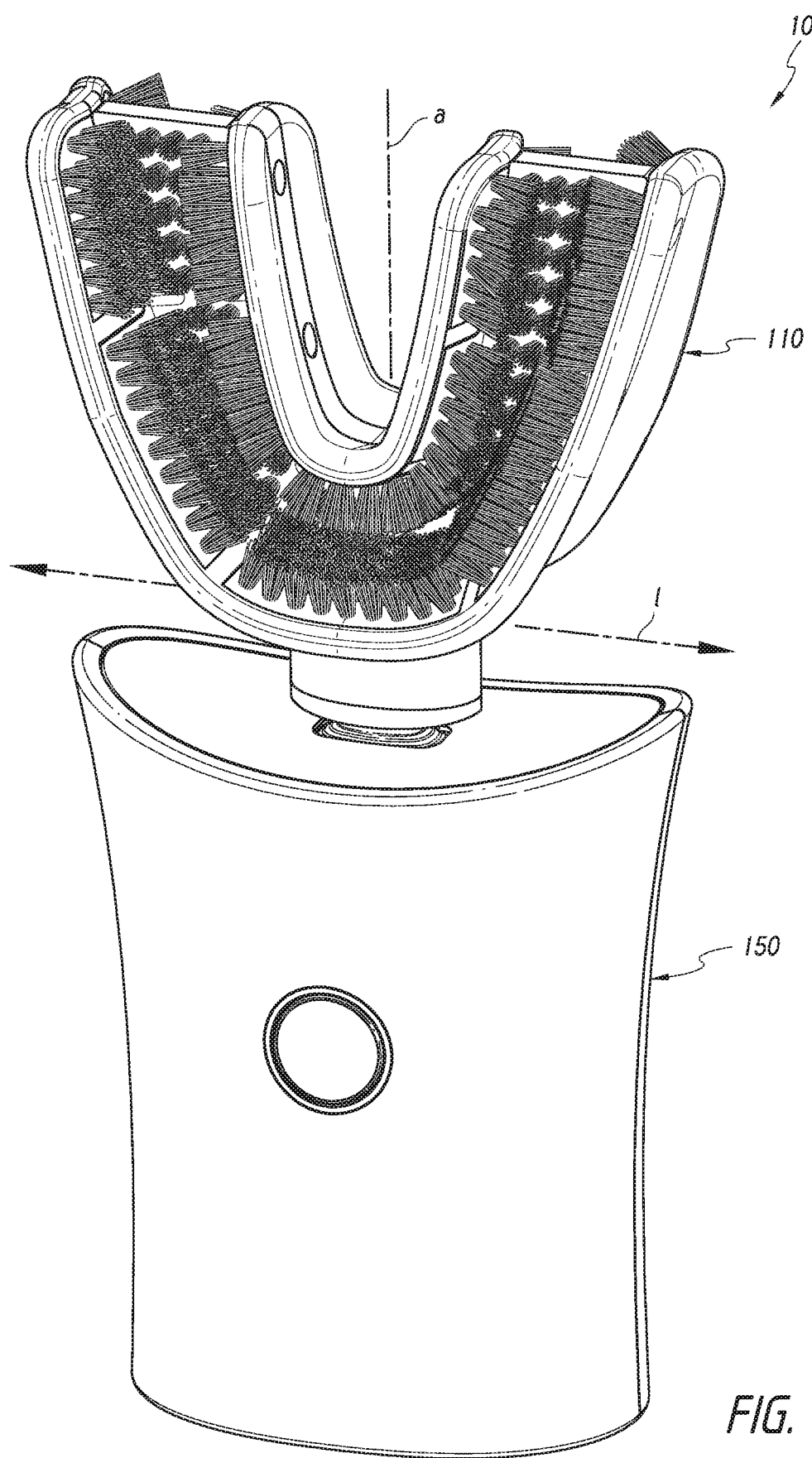
FIG. 1 is a perspective view of a teeth cleaning system in accordance with an aspect of the subject technology.
Figure 2:
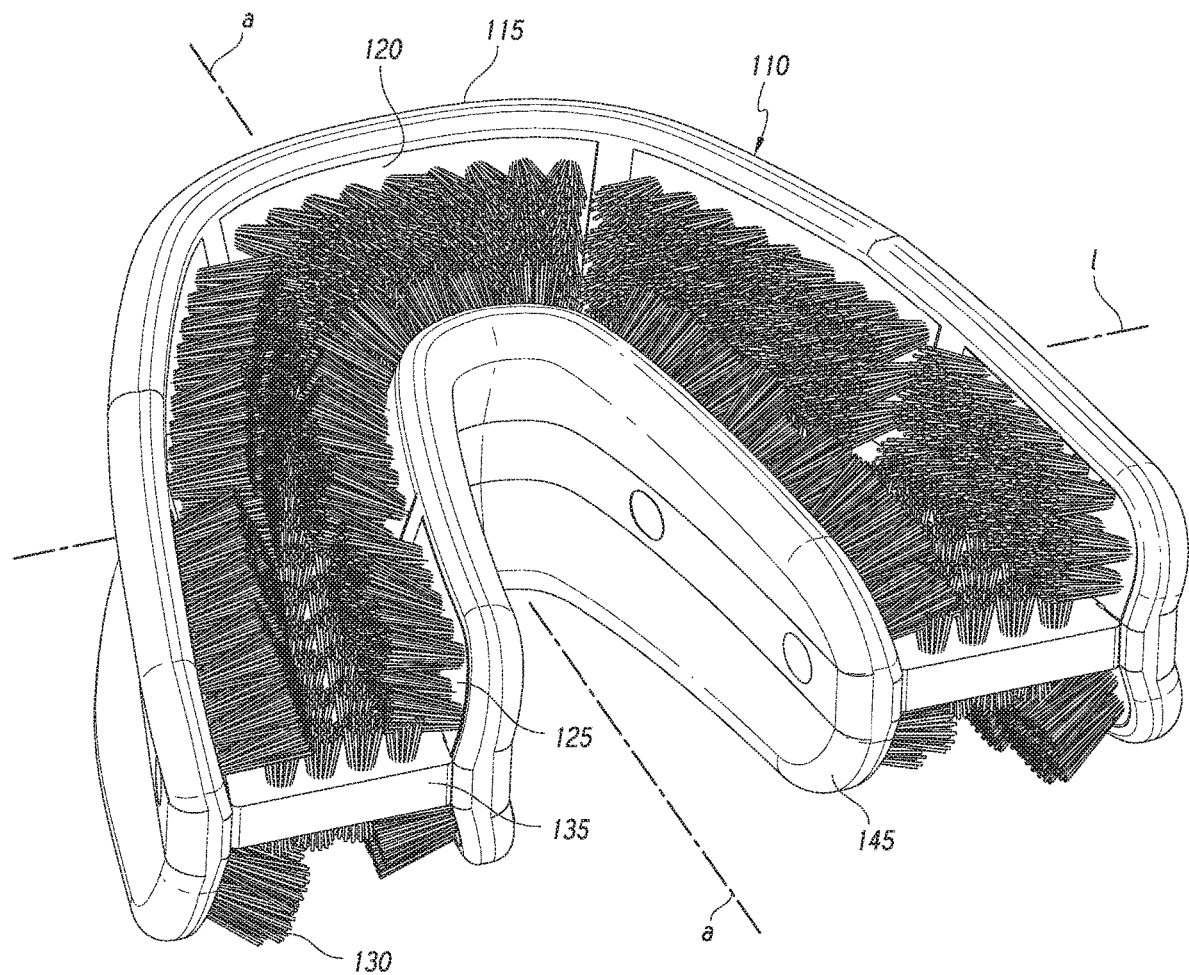
FIG. 2 is a top perspective view of a tray piece of the system of FIG. 1 in accordance with an aspect of the subject technology.
Figure 3:
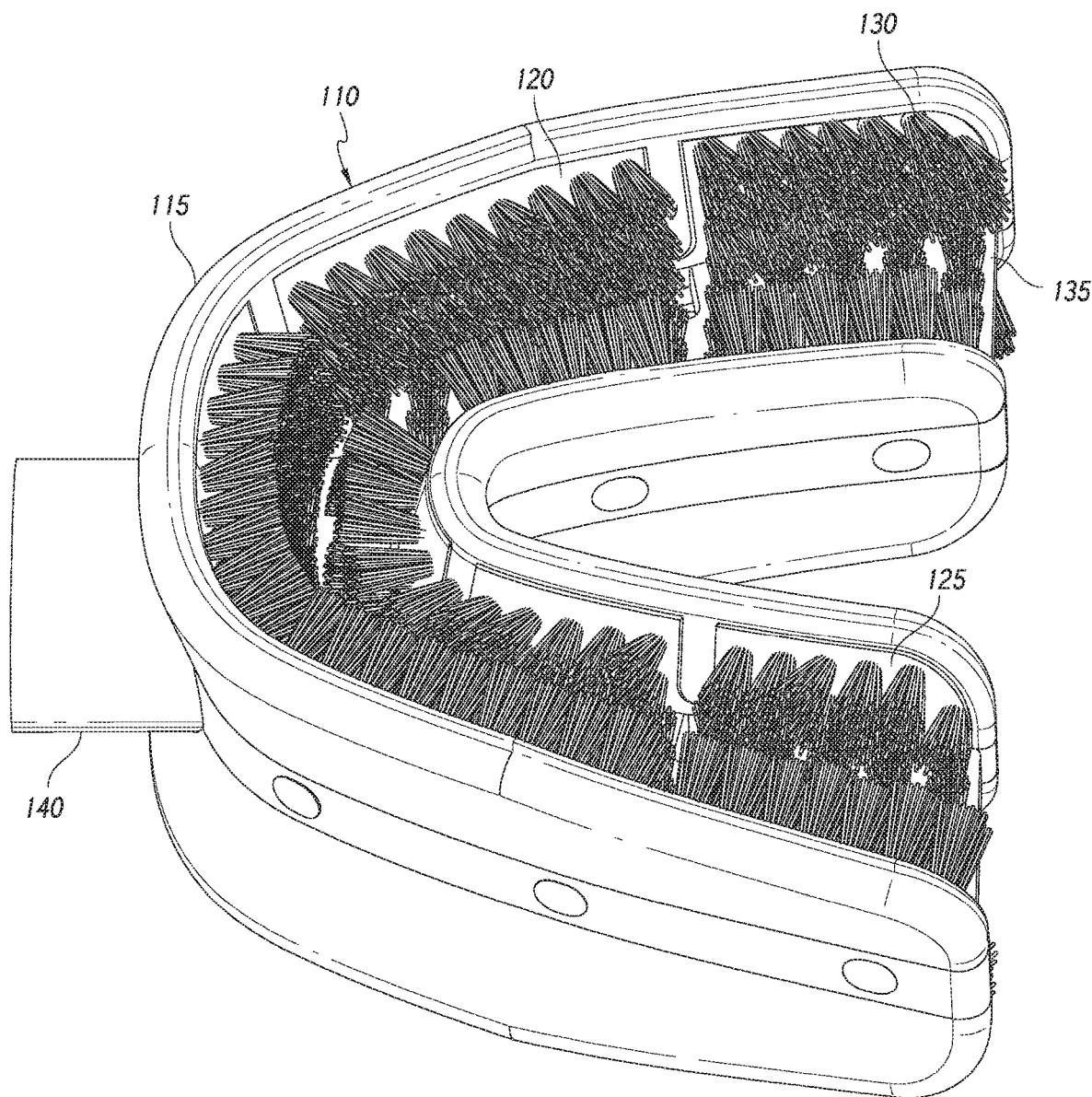
FIG. 3 is a side perspective view of the tray of FIG. 2.
Figure 4:
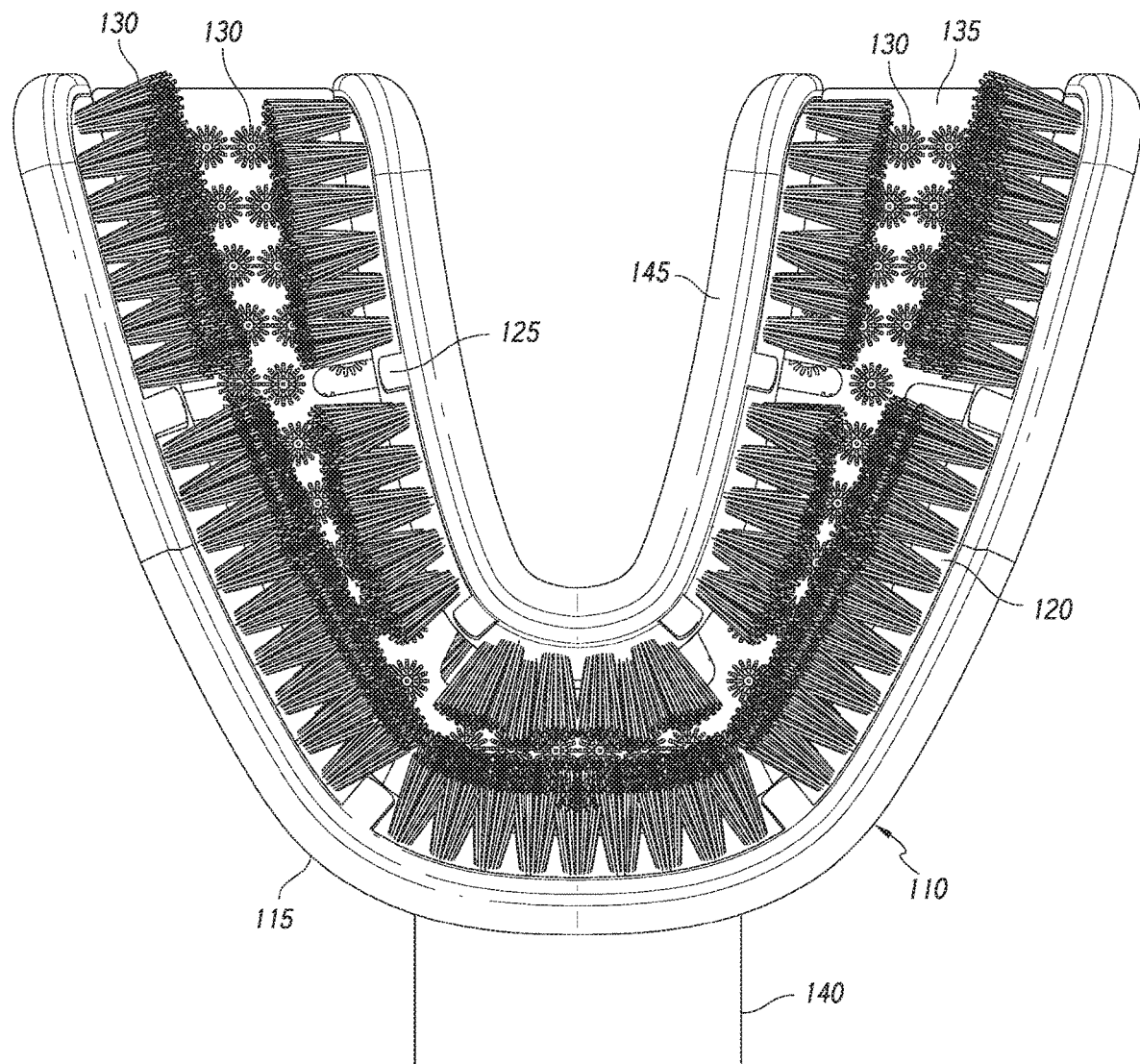
FIG. 4 is a top view of the tray of FIG. 2.
Figure 5:
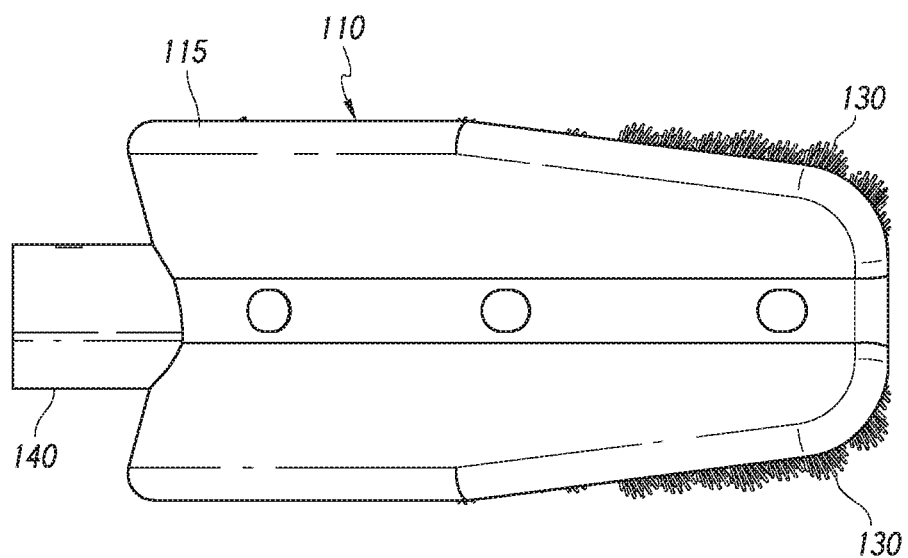
FIG. 5 is a side view of the tray of FIG. 2.

Referring now to FIG. 1, a teeth cleaning system 100 (referred to generally as the "system 100") is shown according to an exemplary embodiment. The system 100 generally includes a tray assembly 110 (referred to sometimes as "tray 110") and a handle assembly 150 (sometimes referred to as the "handle 150"). As will be described in further detail below, the handle assembly 150 is motorized. The tray 110 is connected to the handle 150 so that the tray 110 is actuated to brush a user's teeth. In general use, the tray assembly 110 may be inserted into a user's mouth (not shown) axially along an axis "a". The axis "a" represents the line or plane that extends from the bottom of the handle 150 to front of the tray assembly 110 and is generally in the direction of insertion. When the handle 150 is operated, the motor element (described below) may actuate the tray assembly 110 laterally (relative to the axis "a") along an axis "I". For example, the left and right sides of the tray 110 may move toward the left and right sides of the handle 150.

Referring now to FIGS. 2-8, the tray assembly 110 is shown according to an exemplary embodiment. The tray 110 may be generally arcuate to loosely index to the shape of a user's jaw. In an exemplary embodiment, the tray 110 may include an outer arcuate wall 115 and an inner arcuate wall 145. In some embodiments, a baffle 135 may be positioned transversely to span across between an inner surface 120 of the outer arcuate wall 115 and an inner surface 125 of the inner arcuate wall 145. The baffle 135 may follow the general arcuate shape of the tray 110. In some embodiments, the baffle 135 may be parallel to the plane of the axis "I" and transverse to the axis "a" (see FIG. 2). The arrangement of the baffle 135 between the outer arcuate wall 115 and the inner arcuate wall 145 may define an upper arcuate channel for receiving teeth of an upper jaw and may define an arcuate lower channel for receiving teeth of a lower jaw in use. A plurality of brushing elements 130 is positioned in the channels of the tray assembly 110. The brushing elements 130 may be for example bristles (sometimes referred to as "bristle-hairs" or "strands"). In some embodiments, the bristles may be for example, nylon, microfiber, sponge, organic sponge, fabric, rubber, silicone, or bamboo.

Figure 6:
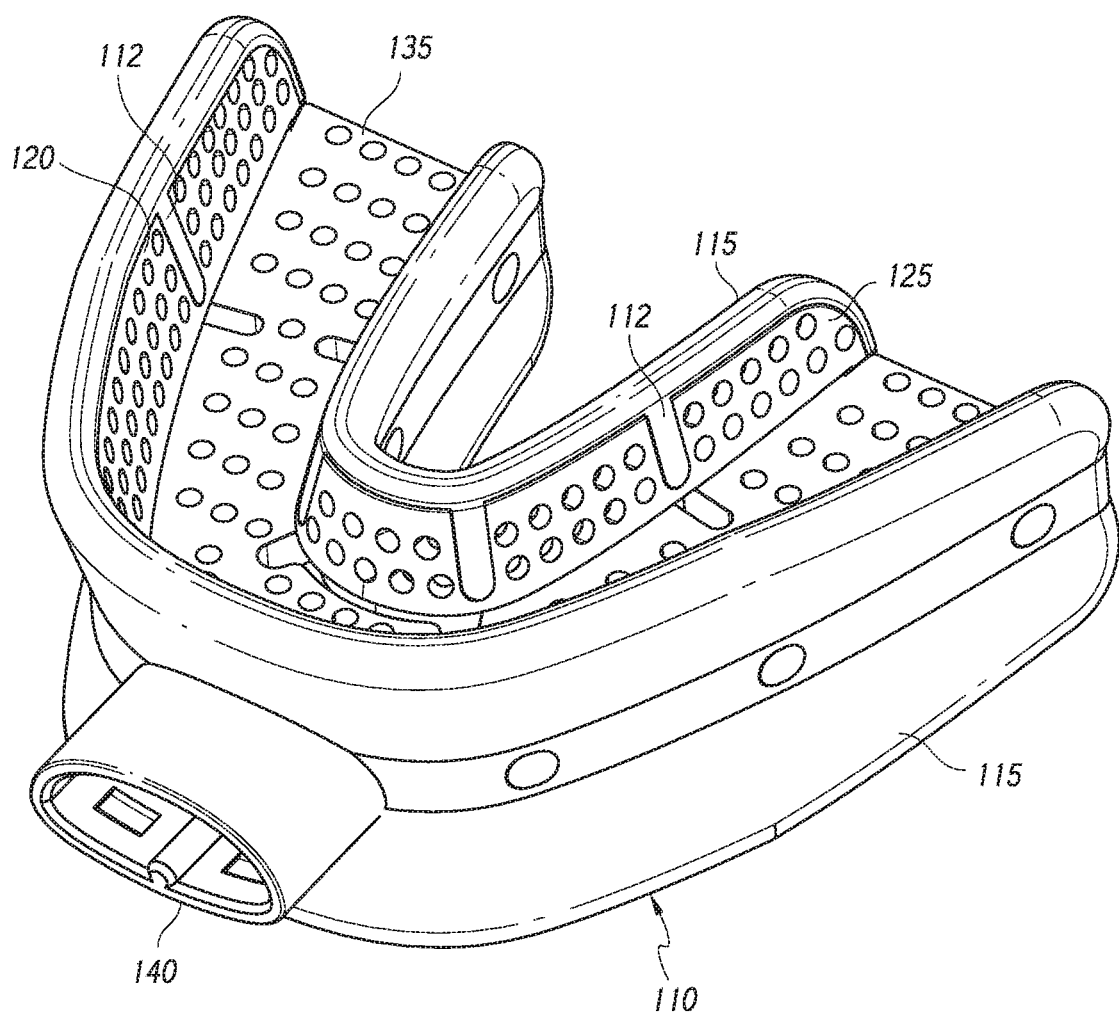
FIG. 6 is a side perspective view of the tray of FIG. 2 with bristles removed.
Figure 7:
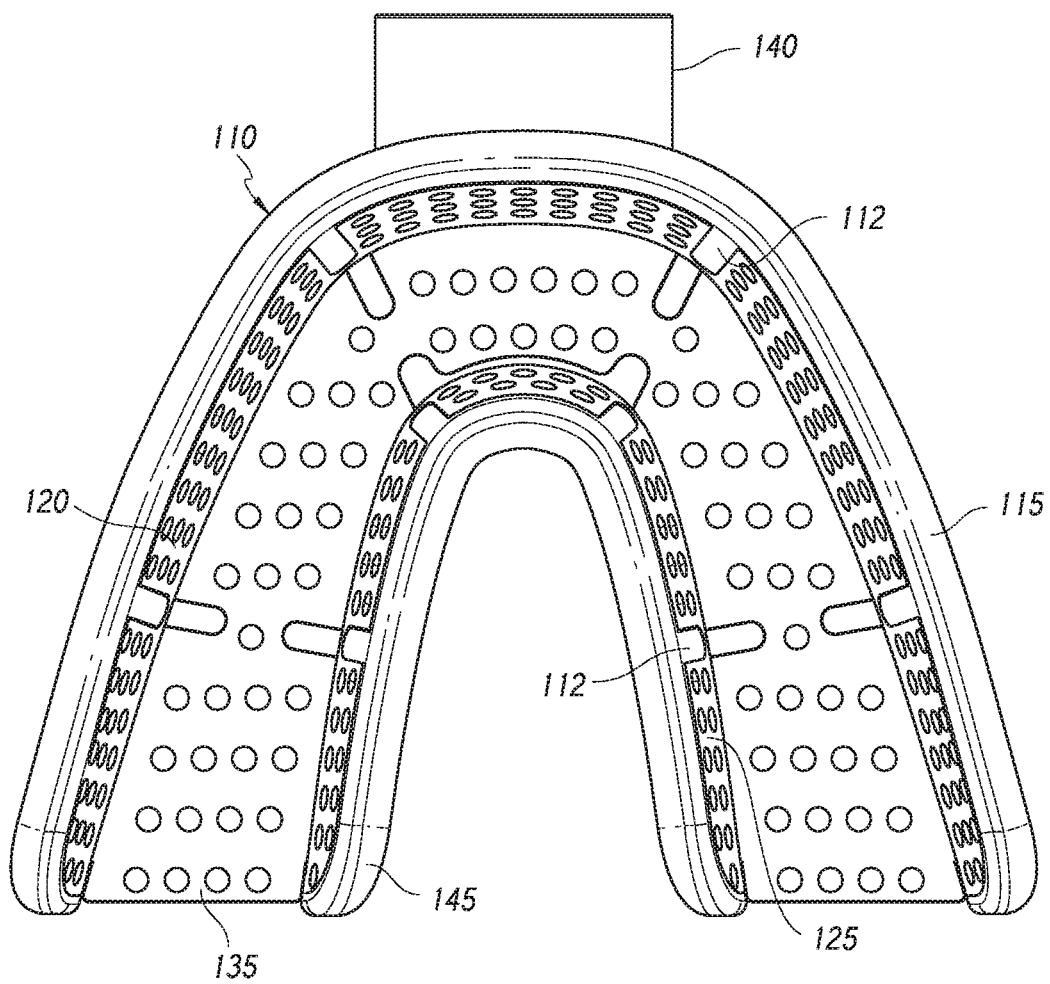
FIG. 7 is a bottom view of the tray of FIG. 2 with bristles removed.
Figure 8:
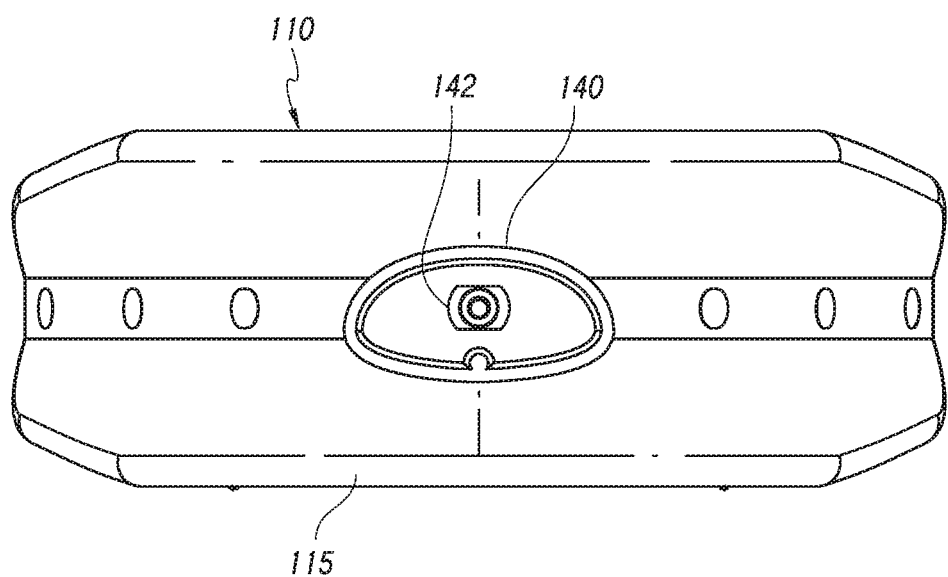
FIG. 8 is a connector side end view of the tray of FIG. 2.
Figure 9:
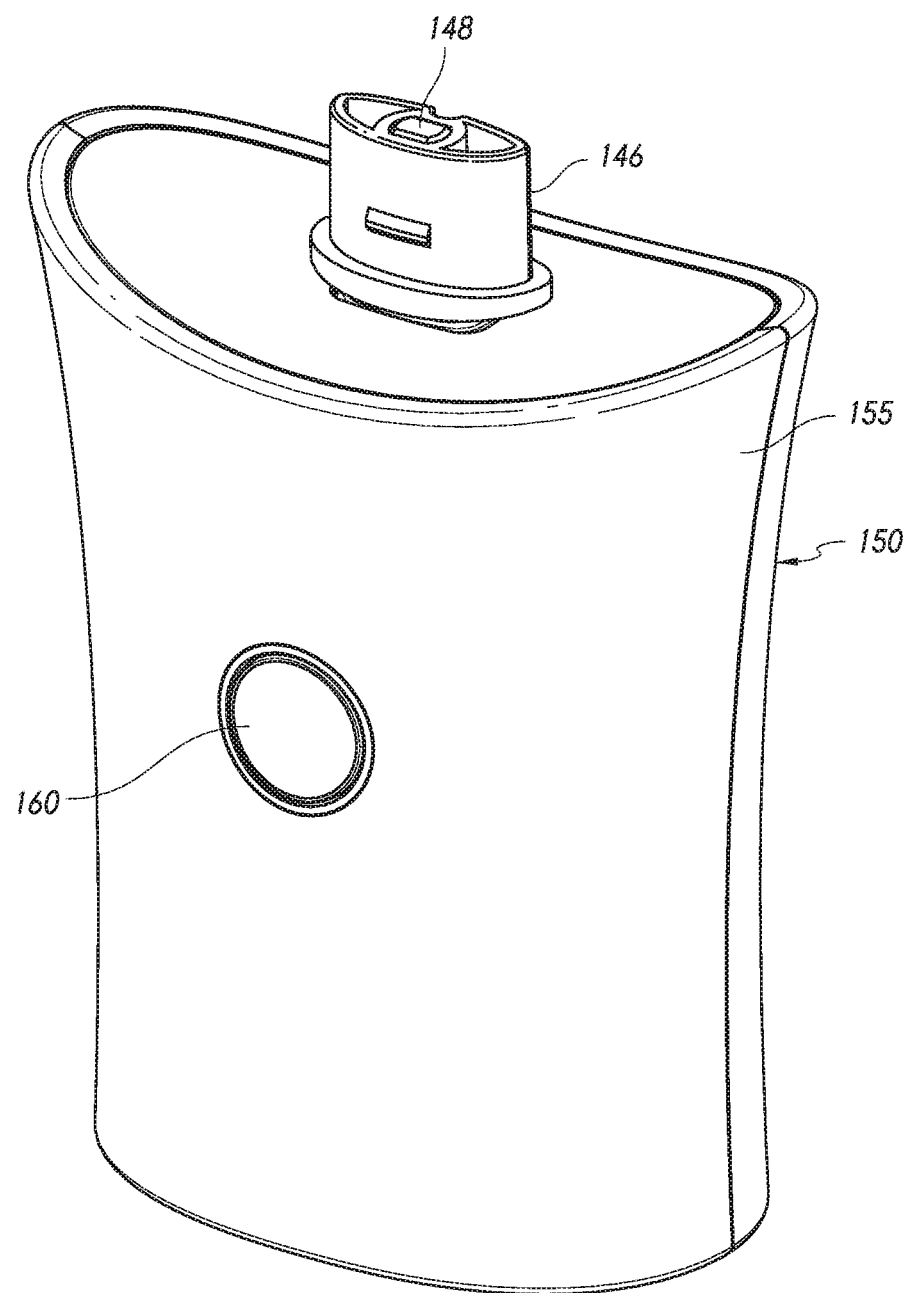
FIG. 9 is a perspective view of a motorized handle of the system of FIG. 1 in accordance with an aspect of the subject technology.
Figure 10:
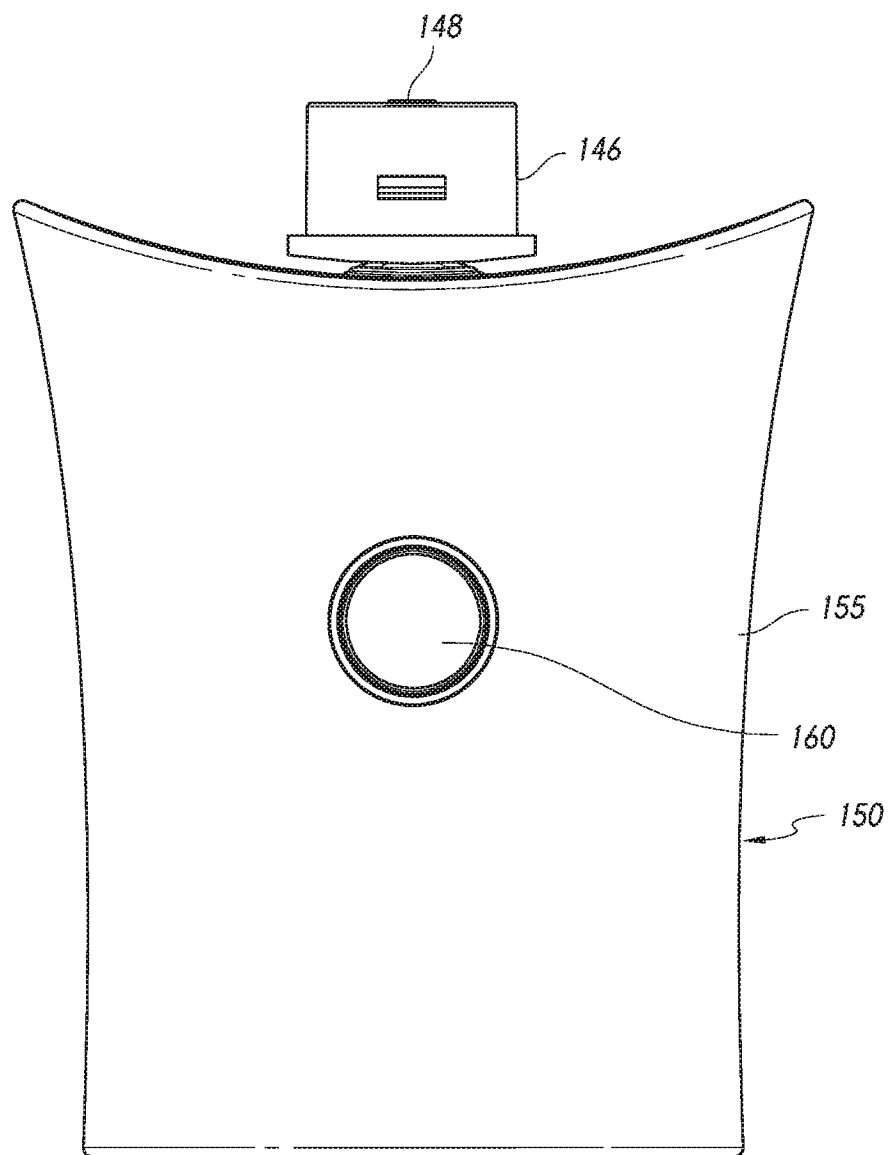
FIG. 10 is a front view of the handle of FIG. 9.
Figure 11:
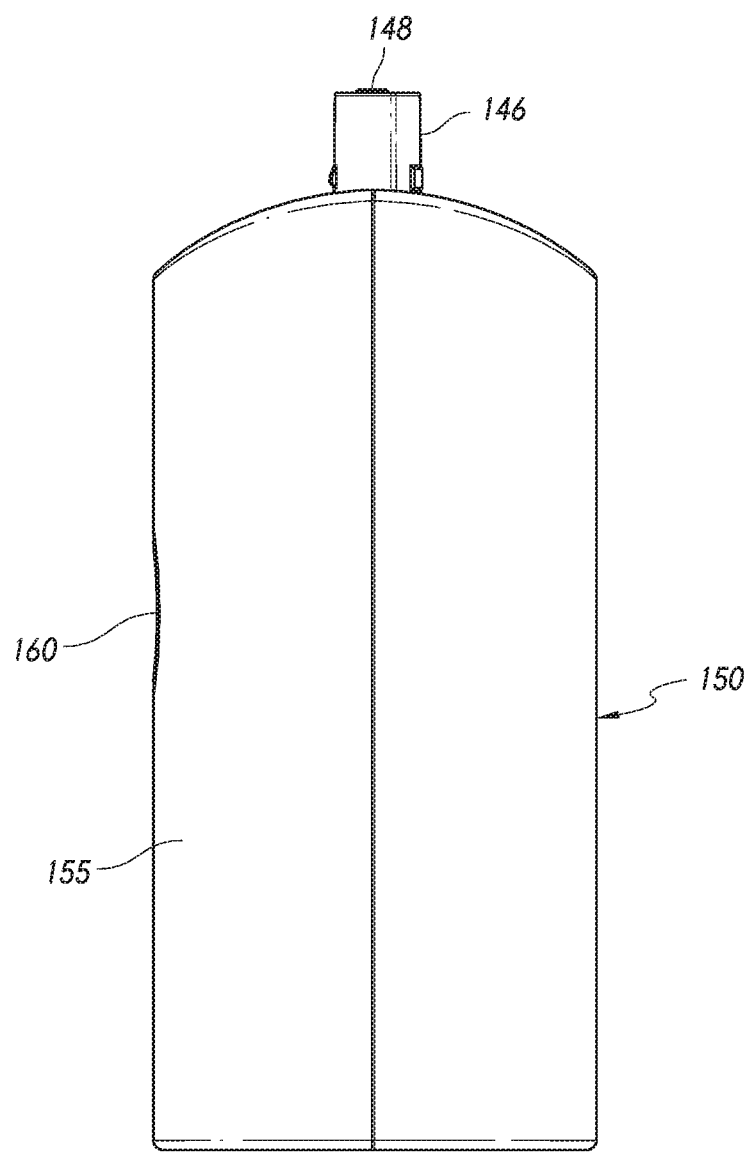
FIG. 11 is a side view of the handle of FIG. 9.
Figure 12:
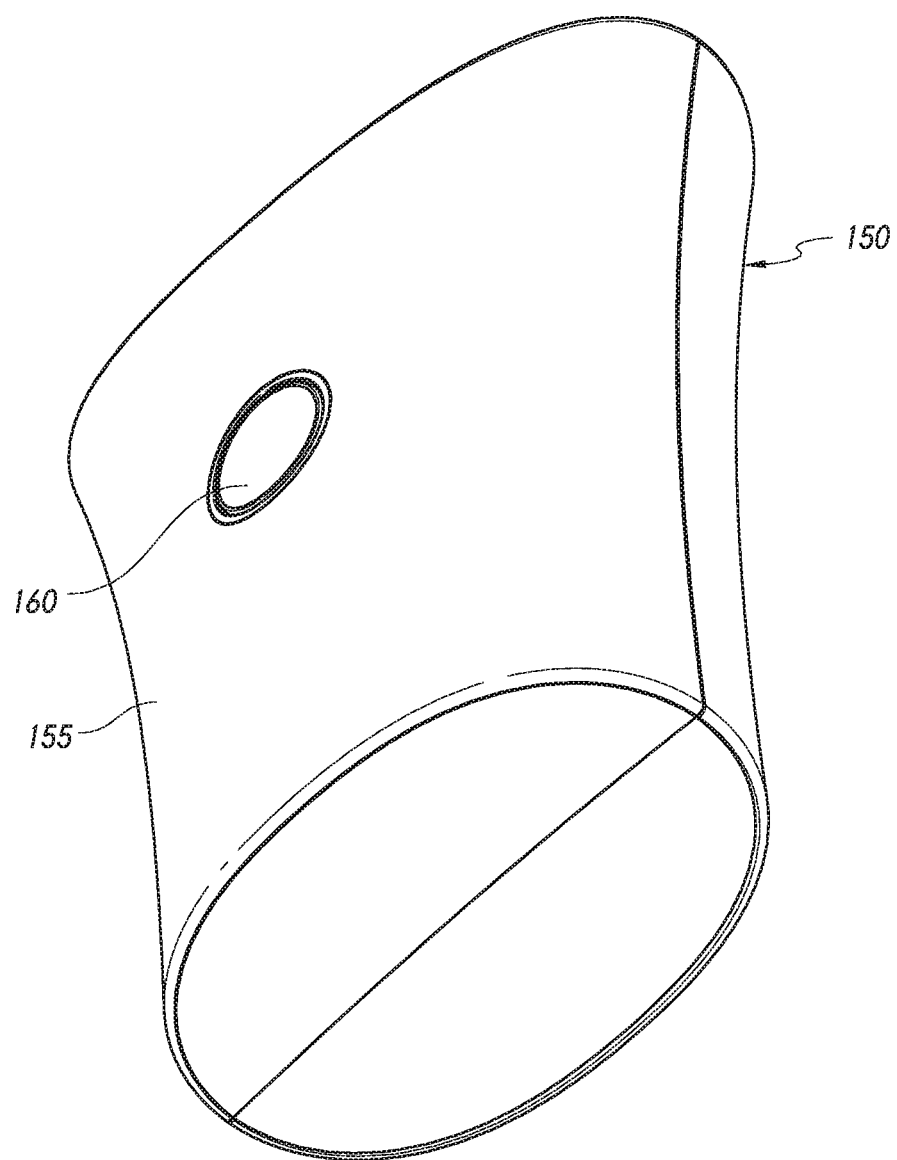
FIG. 12 is a bottom perspective view of the handle of FIG. 9.

In some embodiments, the outer arcuate wall 115, the inner arcuate wall 145, and the top and bottom surfaces of the baffle 135 include a plurality of receptacles (holes) (FIGS. 6 and 7). Each of the receptacles may be configured to hold a bundle of bristles 130. The free ends of bristles 130 may be arranged to contact the anterior, posterior, and top surfaces of each tooth (as well as reach in between teeth and gums). In some embodiments, the bundles of bristles projecting from the inner surface 120 of the outer arcuate wall 115 and from the inner surface 125 of the inner arcuate wall 145 may project at an acute angle relative to the plane of the upper/lower surface of the baffle 135. In operation, as the tray 100 is actuated, the bristles 130 on the baffle 135 brush the top surfaces of teeth. The bristles on the inner surface 120 of the outer arcuate wall 115 and from the inner surface 125 of the inner arcuate wall 145 brush the anterior and posterior surfaces of teeth. The angle of the bristles on the inner surface 120 of the outer arcuate wall 115 and from the inner surface 125 of the inner arcuate wall 145 promote brushing along the height of a tooth's anterior/posterior face. In some embodiments, the bristles 130 on the innermost and outermost rows of the baffle 135 may partially overlap with the bristles 130 (on the rows closest to the baffle 135) on the inner surface 120 of the outer arcuate wall 115 and of the inner surface 125 of the inner arcuate wall 145.

In an exemplary embodiment, the bristles may be arranged in a density of approximately 42 bristles per hole and 452.4 bristle-hairs per square centimeter. Embodiments may vary the bristle density between 324 bristles per $cm^2$—646 bristles per $cm^2$. As will be understood, the density of bristles may vary depending on factors such as bristles per hole, number of holes, spacing of holes, diameter of holes, and diameter of bristle strands used. For example, in embodiments that use softer bristles with thinner strand diameters than the embodiment with 42 bristles per hole, there may be approximately 84 bristles per hole which yields approximately the same density but with a softer brush rating. Similarly, embodiments using firmer bristles with thicker strand diameters may use 24 bristles per hole to achieve the same density. Accordingly, the bristle density may be manipulated by increasing or decreasing the strand diameter and/or the number of strands per hole. In addition, the other aforementioned factors (relating to hole position, size, and spacing) may be manipulated to generate a bristle density within the disclosed range. For example, more empty areas between holes may require more bristles to provide the same density and vice versa.

Thus, when referring to "bristle density," the subject disclosure encompasses in general the density of bristle material per area with the understanding that substitutions may be made in any of the underlying factors of bristle density while still falling within the scope of the technology herein. The bristle material per area may be based on the diameter of a bristle used in an embodiment multiplied by the numbers of bristles per unit of area.

Embodiments may include 327 to 653 holes overall on the surfaces 120 and 125, and on both sides of the baffle 135. In an exemplary embodiment, there may be approximately 480 holes overall on the surfaces 120 and 125, and on both sides of the baffle 135. Embodiments may position holes with a distance of 1.8 mm to about 0.75 mm between holes. In some embodiments, there may be approximately 7.72 holes per $cm^2$ of a surface (120, 125, 135) to approximately 15.38 holes per $cm^2$. In an exemplary embodiment, there are approximately 11.31 holes per $cm^2$.

There may be approximately 42 bent bristles/hole. Embodiments may include a range of approximately 25-55 bristles per hole. The bristle thickness may range from 0.01 mm to 0.2 mm. For embodiments with 42 bristles per hole, the bristle thickness may be approximately 0.15 mm. In total, there may be approximately 13,100 to 26,120 bent bristle hairs inserted into the tray assembly 110. In an exemplary embodiment, there may be 19,200 bent bristle hairs inserted into the tray assembly 110. As will be seen, the density of bristles is above the conventional density of bristles in previous systems, which leads to improved coverage of the brushing area for the surfaces of teeth. With a minimal range of motion, the system 100 is able to brush teeth more efficiently. It will be appreciated that this is a significant improvement in technology since the range of space available to move laterally within a user's mouth is limited. The density of bristles 130 in the subject technology allows for better brushing effectiveness in the limited range of lateral movement.

In some embodiments, the inner surface 120 of the outer arcuate wall 115 and/or the inner surface 125 of the inner arcuate wall 145 may include slots. See FIGS. 6 and 7. As will be appreciated, the slots 112 provide flexure in the tray 110 so that the tray 100 may flex to accommodate the fit of different sized jaws. In some embodiments, the outer arcuate wall 115 and the inner arcuate wall 145 may comprise shells of a soft plastic, for example, thermoplastic polyurethane, silicone, or a thermoplastic elastomer, providing support for holding the inner surfaces 120 and 125. In some embodiments, the inner surfaces 120 and 125 may comprise a material that is firmer than the outer arcuate wall 115, for example, a hard plastic (which may be for example, polypropylene, acrylonitrile butadiene styrene, or a polycarbonate plastic). As may be appreciated, the softer material of the outer arcuate wall 115 and the inner arcuate wall 145 provide a user comfort since these elements may contact the user's inner cheek surfaces as the brushing elements 130 engage the user's teeth and gums. In some embodiments, the inner surfaces 120 and 125 may be firm providing a solid support structure for detaining the brushing elements 130 in place during use.

Referring now to FIGS. 3-8, in some embodiments, the tray assembly 100 may include a connector 140 coupled to an exterior surface of the outer arcuate wall 115. The connector 140 may be configured to receive the oscillator mechanism discussed below in more detail. For example, some embodiments may include a mating element 142 (for example, a female receptacle) which may receive a drive element (described below in reference to FIGS. 9-12) that actuates the tray assembly 110.

Figure 13:
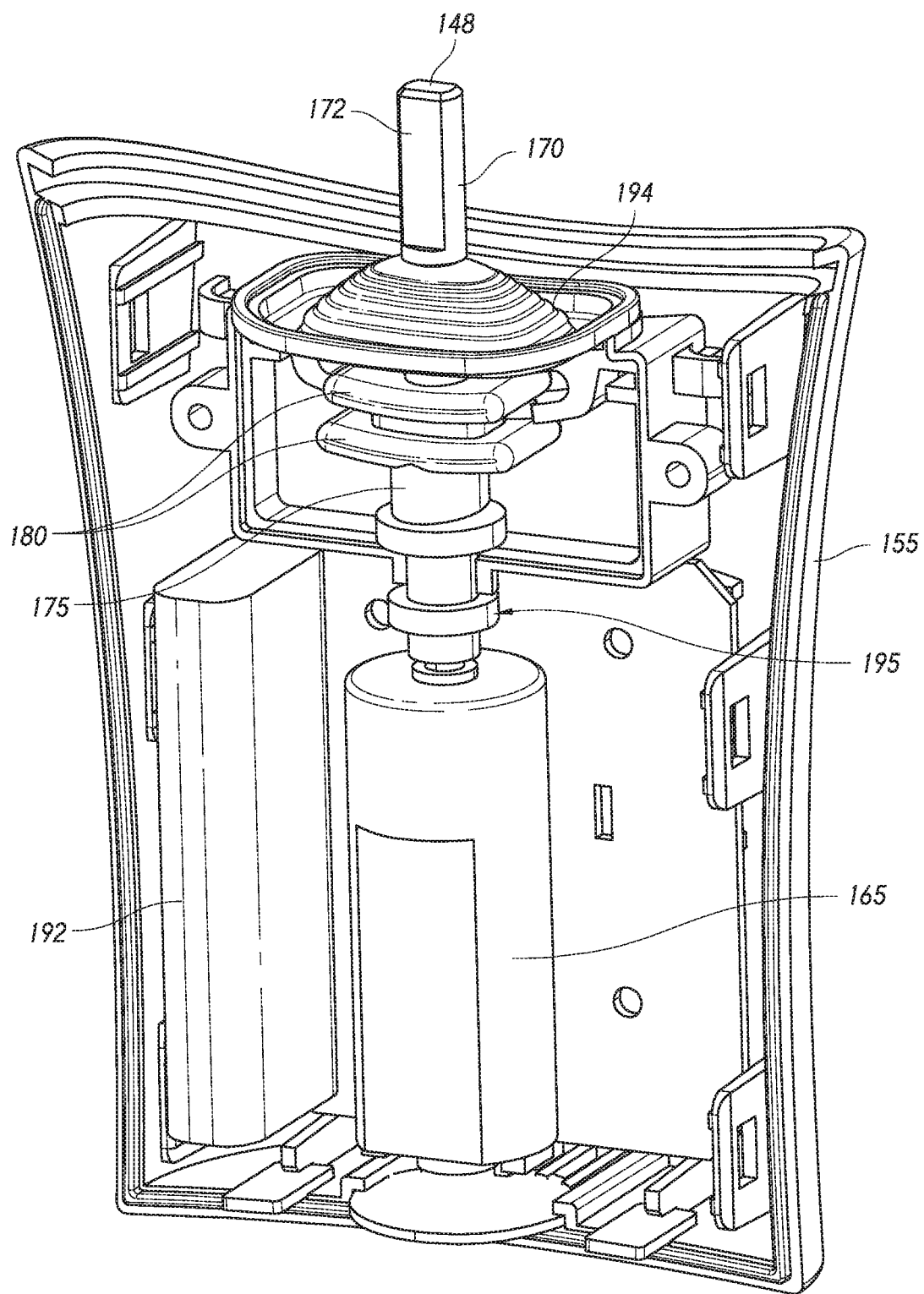
FIG. 13 is a perspective, internal view of motorized elements in the handle of FIG. 9 in accordance with an aspect of the subject technology.
Figure 14:
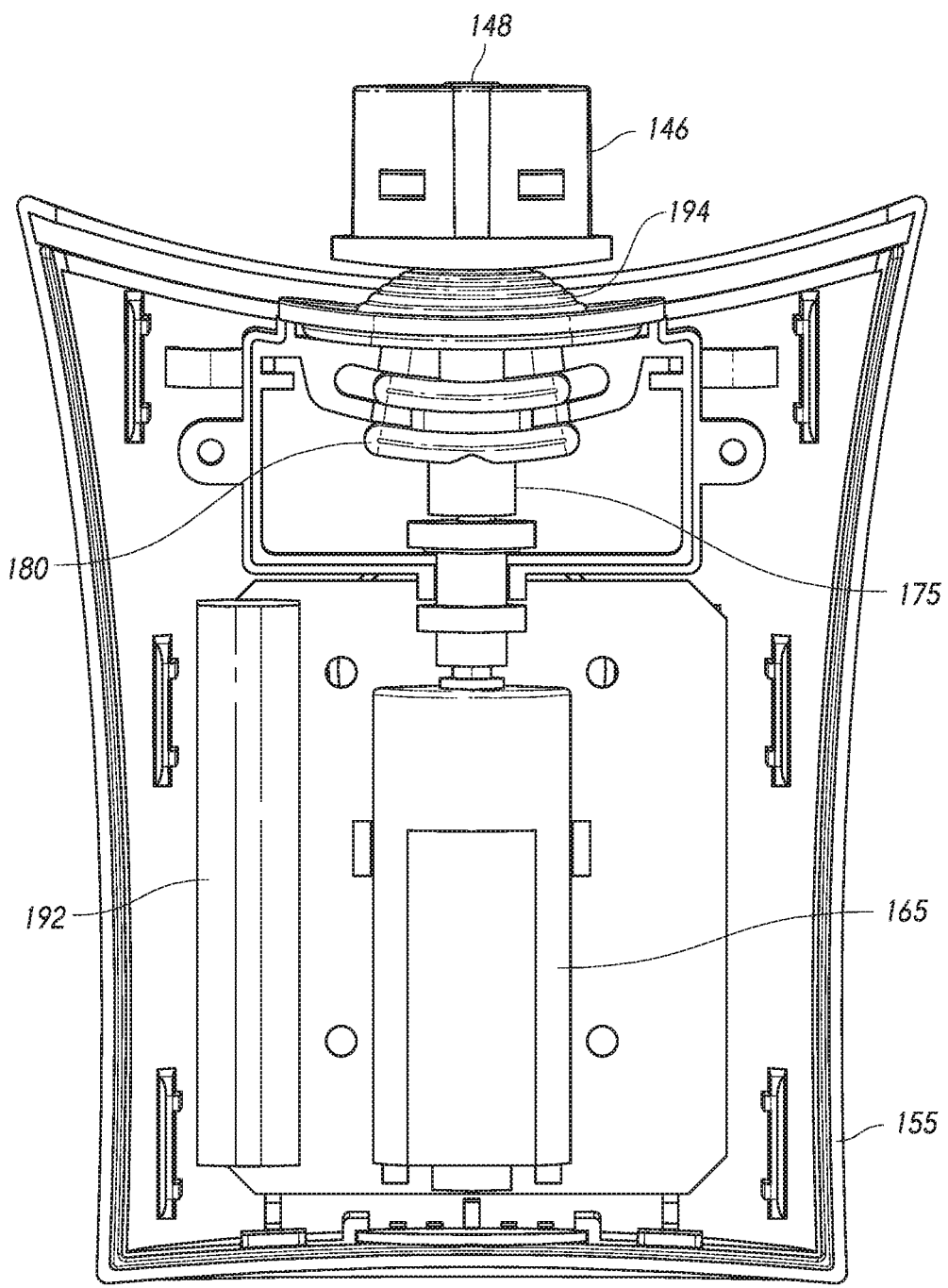
FIG. 14 is a front view of the handle of FIG. 13.
Figure 15:
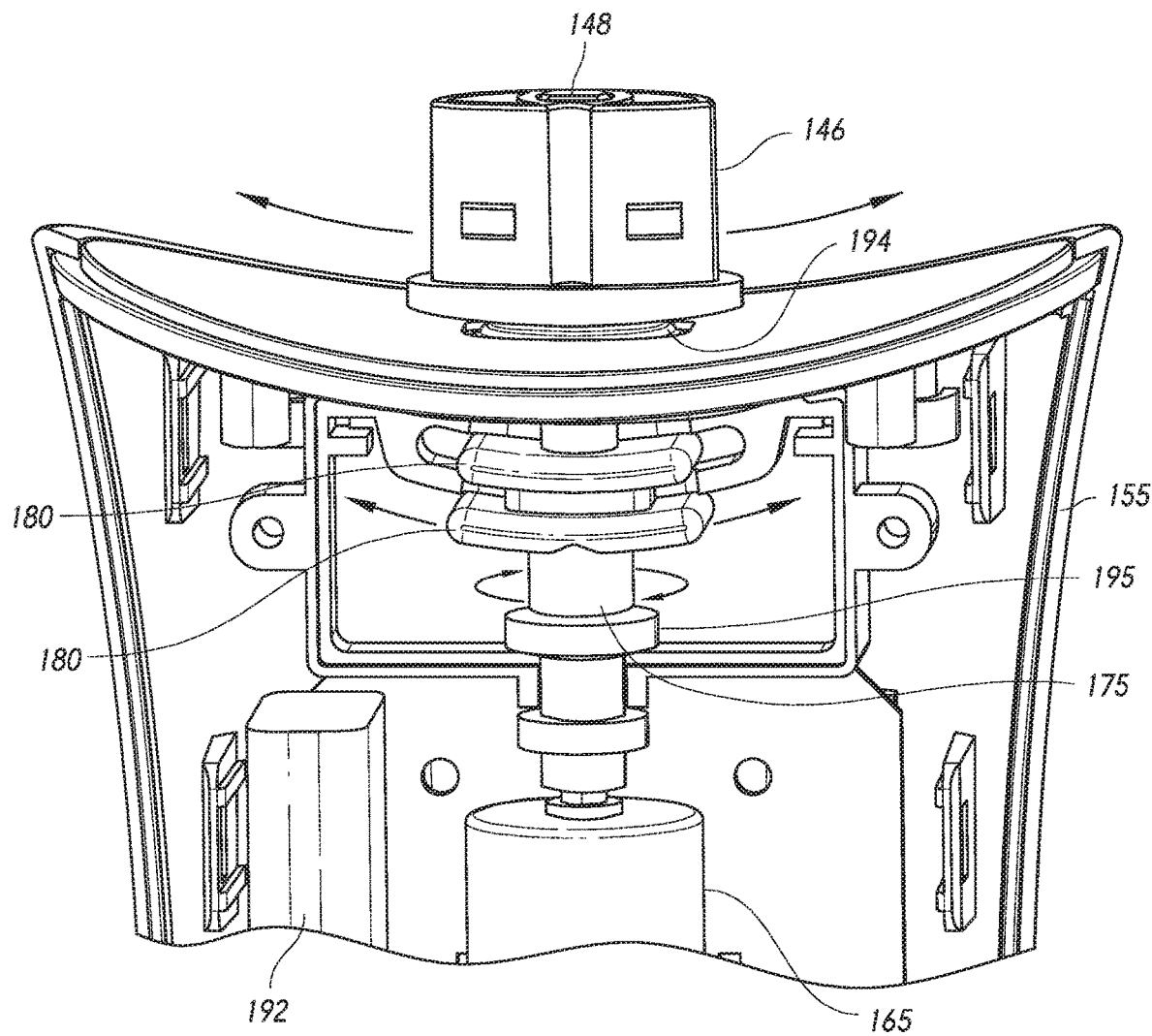
FIG. 15 is a partial front view of the handle of FIG. 13 with an enlarged view of an oscillator system and depicting a side-to-side oscillating motion of a shaft in accordance with an embodiment.
Figure 16:
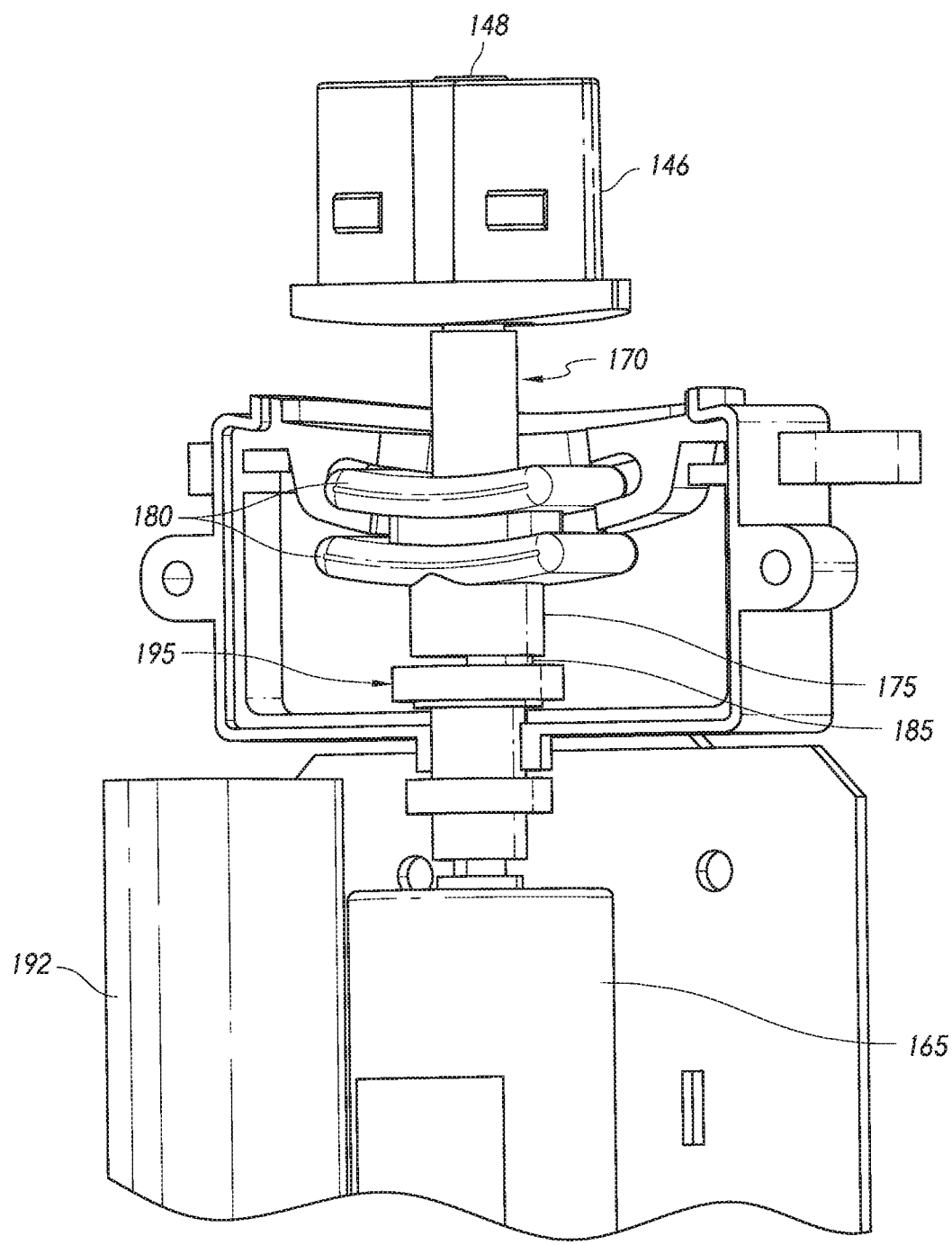
FIG. 16 is a front perspective view of the oscillator system of FIG. 15.
Figure 17:
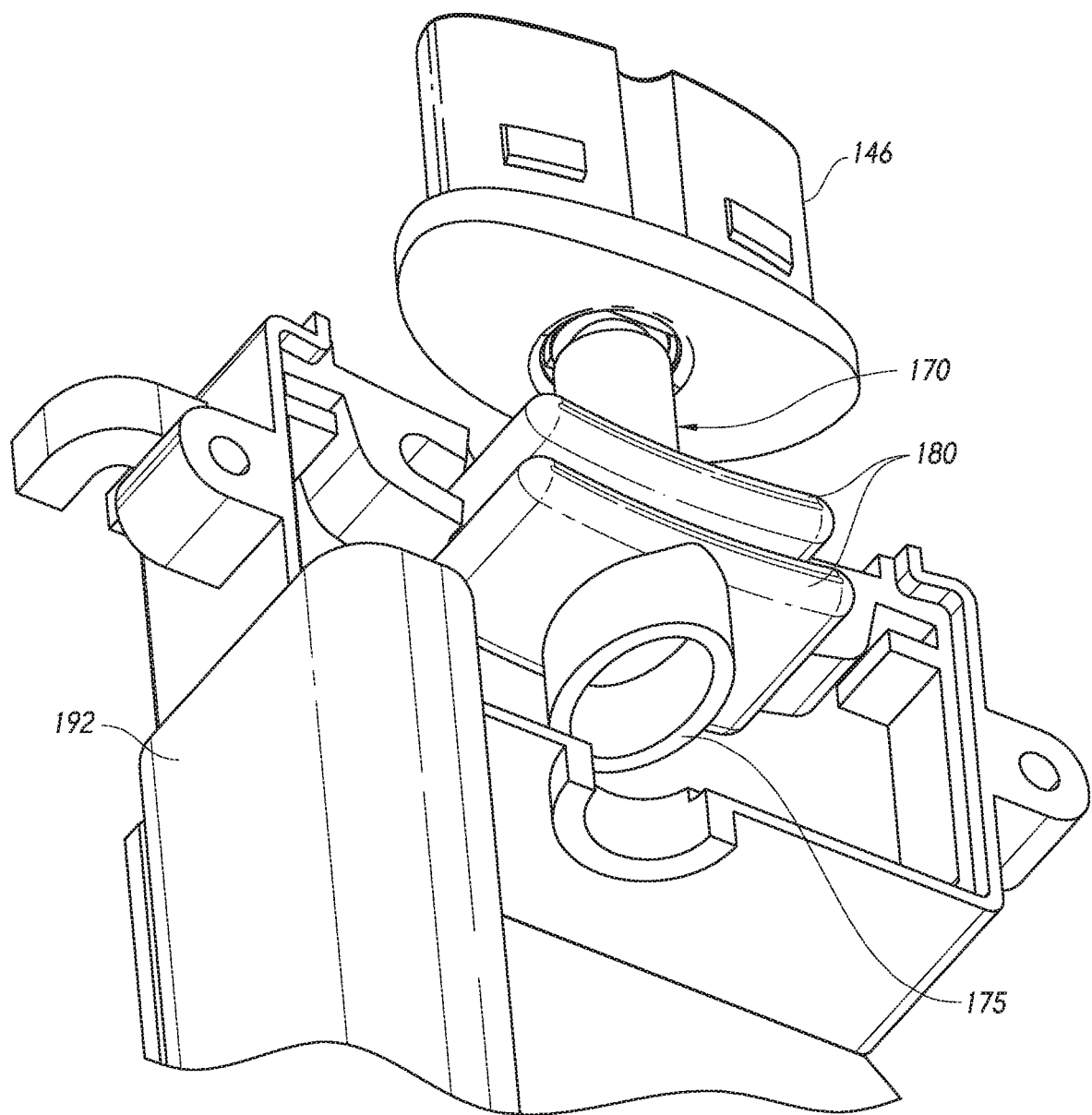
FIG. 17 is a bottom perspective view of a guide plate and shaft assembly in the oscillator system shown in FIG. 15.

Referring now to FIGS. 9-12, the handle assembly 150 is shown according to an exemplary embodiment. The handle 150 includes a casing 155 and a button 160 which when triggered, activates the actuation of the tray assembly 110. The handle 150 may house an oscillator assembly 170. In an exemplary embodiment, the oscillator assembly 170 includes a shaft 172 (seen in FIG. 13) protruding from a top end of the casing 155. The shaft 172 may be covered by a sleeve 146. The sleeve 146 may be a male connection configured to slide into the opening in the connector 140. A distal end 148 of the shaft 172 may be configured to mate with the mating element 142 in the connector 140 shown in FIG. 8. The oscillator assembly 170 may be configured to move the shaft 172 side-to-side, which when the shaft 172 is actuated, drives the tray assembly 110 to oscillate from one side to the other in a lateral direction.

While the above mating configuration was described with the sleeve 146 attached to the handle 150, it should be understood that in other embodiments, the sleeve 146 may instead be in the connector 140 and the end 148 of the shaft 172 is inserted through the interior of the sleeve 146 to connect to the mating element 142.

Figure 18:
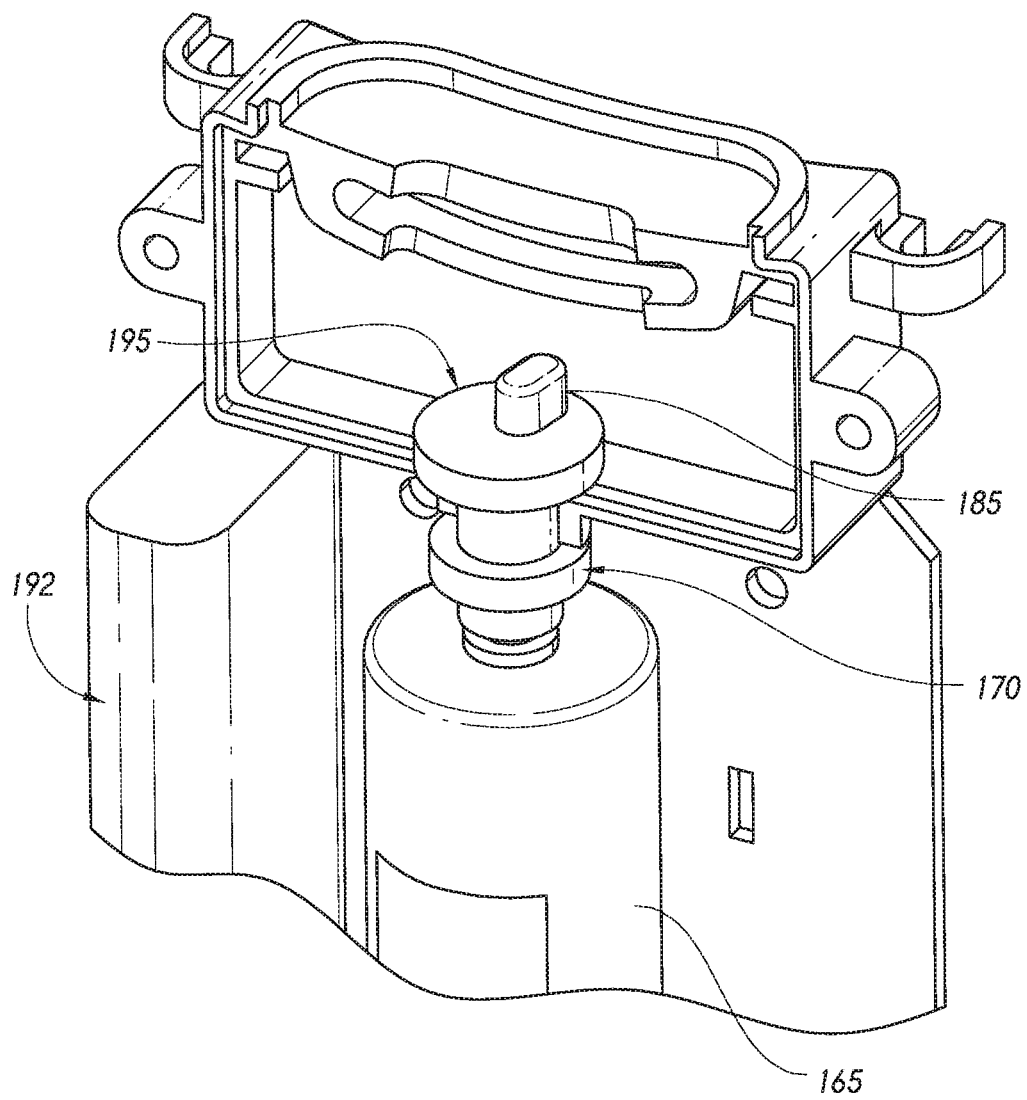
FIG. 18 is a top perspective view of a cam system in the oscillator system of FIG. 15.
Figure 19:
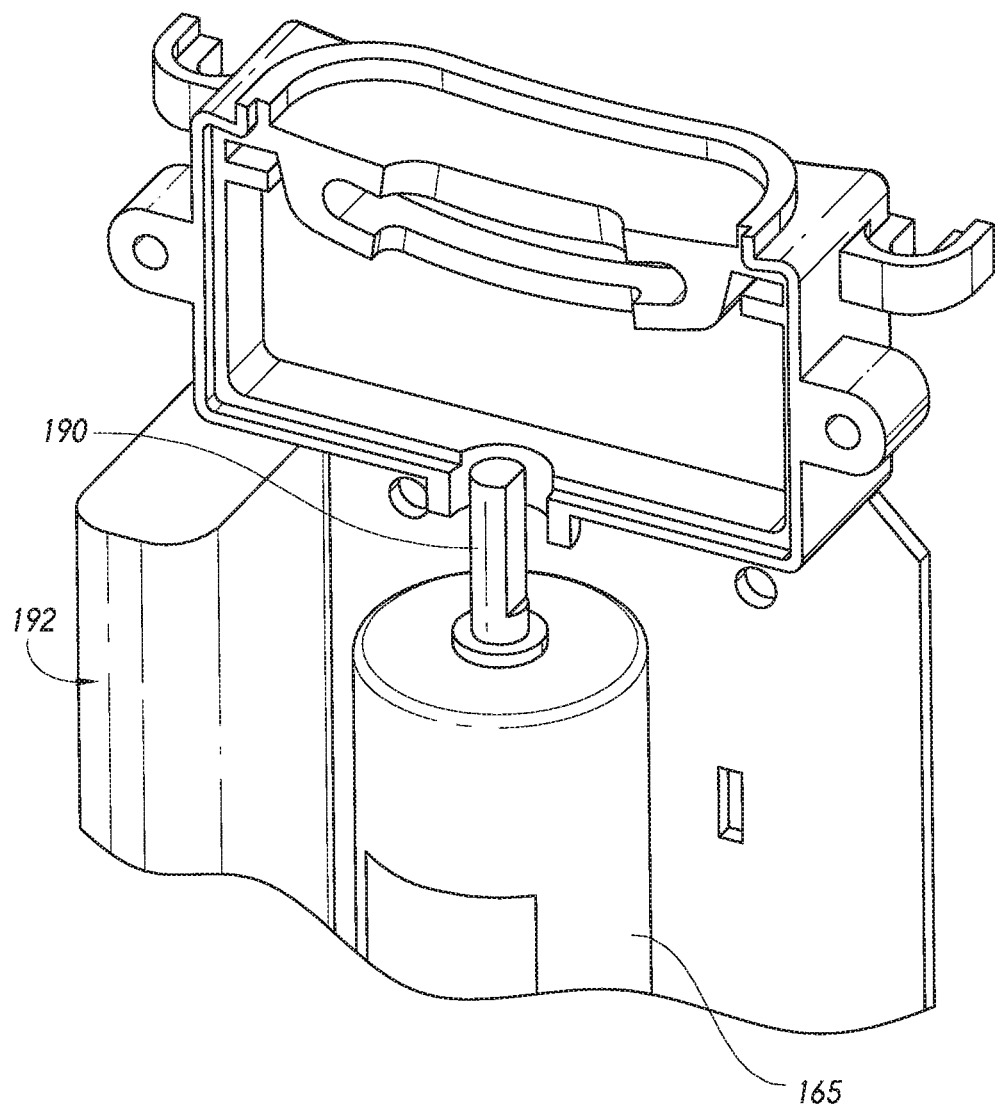
FIG. 19 is a top perspective view of a motor driving the oscillator system of FIG. 15 with the cam system removed.
Figure 20:
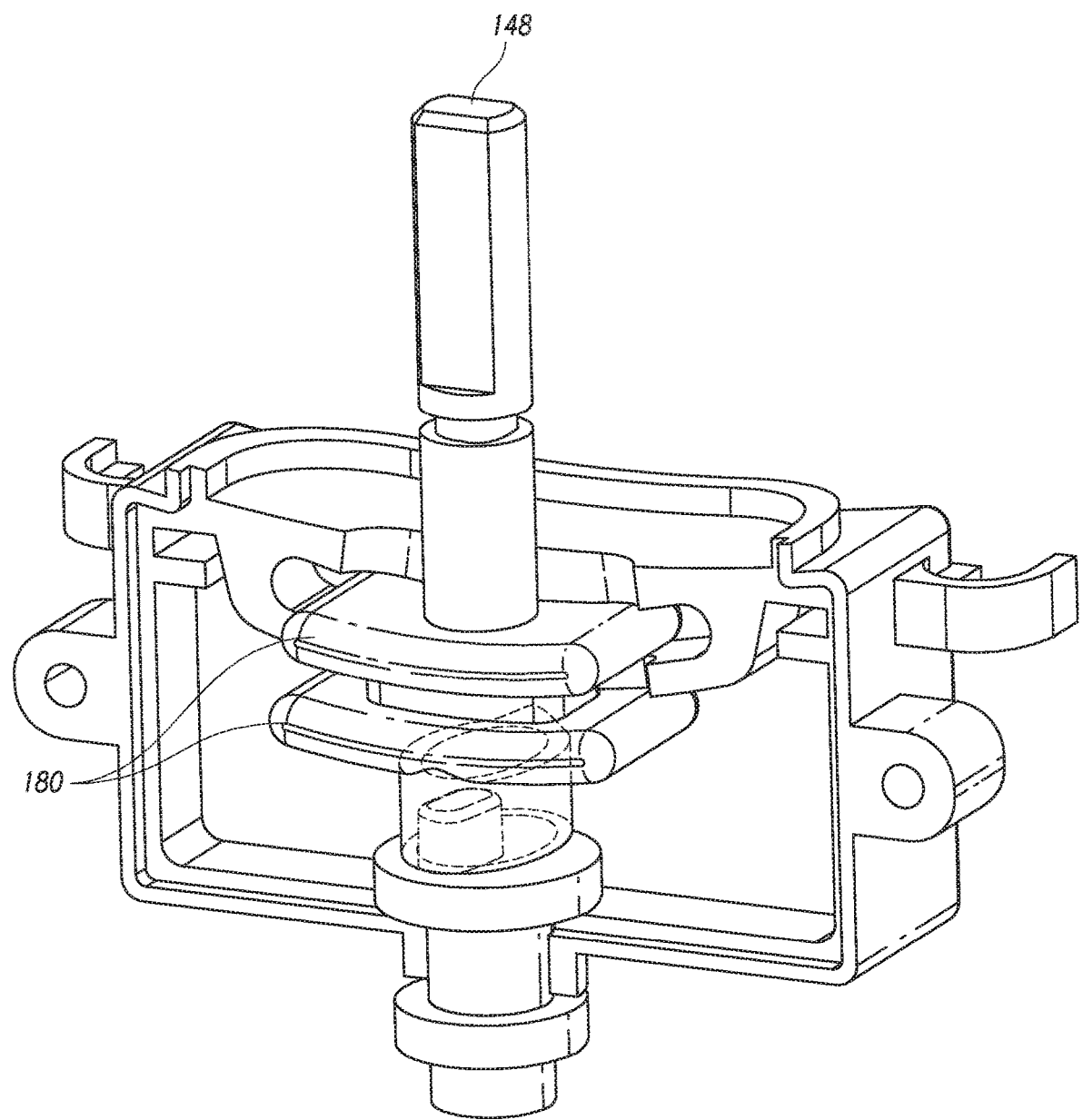
FIG. 20 is a perspective, cross-sectional view of a cam interface in the oscillator system of FIG. 18 according to an exemplary embodiment.

Referring now to FIGS. 13-20, the oscillator assembly 170 and other driving elements inside the casing 155 are shown according to an exemplary embodiment. The actuation from the handle 150 may be driven by a power source 192 which may be a battery, or a storage cell connected to a wall outlet source for plugged-in embodiments of the system 100. The oscillator assembly 170 may be driven by a motor 165. The motor 165 may include a drive shaft 190 (FIG. 19) which rotates during operation. The drive shaft 190 may be coupled to a cam assembly 195. The top of the cam assembly 195 may include a cam 185 (FIG. 18). The cam 185 may couple to a proximal end of the shaft 172. The cam 185 may be configured to, when engaged with the shaft 172, drive the shaft 172 in the lateral direction when the motor's drive shaft 190 rotates the cam assembly 195. In some embodiments, the oscillator assembly 170 may include a sleeve 175 which houses a section of the shaft 172. As shown in FIG. 20, in an exemplary embodiment, the cam 185 may comprise a projection which is received in a pocket of the sleeve 175. As the cam 185 rotates, the projection causes the sleeve 175 to move laterally following the path of the cam rotation. The shaft 172 moves laterally with the sleeve 175. In some embodiments, the handle 150 may include one or more guide plates 180. The guide plates 180 may include slots through which the shaft 172 passes through. The guide plate 180 slot(s) may include a width that defines a range of movement that limits the travel of the shaft 172 in the lateral direction. The guide plates 180 ensure that the shaft 172 stays within a restricted path of motion. Some embodiments may include a cover 194 which prevents water from entering the handle and contacting the internal elements.

Those of skill in the art would appreciate that various components may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

We claim:

1. A teeth cleaning system comprising:
   a tray assembly that is configured to receive teeth of an upper jaw in an upper channel and teeth of a lower jaw in a lower channel;
   a connector that is coupled to an outer surface of the tray assembly and has an opening defined therein; and
   a handle assembly that includes:
      a shaft that is slidably engageable with the opening of the connector,
      a motor with a drive shaft that rotates during operation,
      a cam to which the shaft and the drive shaft of the motor are coupled,
         wherein the cam is configured to drive the shaft in a lateral direction in response to being rotated by the drive shaft of the motor,
      a guide plate with an aperture defined therein,
         wherein the shaft extends through the aperture such that a range of movement in the lateral direction is limited by a width of the aperture, and
      a casing in which the motor, the cam, the guide plate, and a proximal end of the shaft are housed, and
      a sleeve that houses a portion of the shaft that is internal to the casing.

2. The teeth cleaning system of claim 1,
   wherein the opening is defined by an inner surface of the connector, and
   wherein a mating element in the form of a female receptacle is centrally located within the opening of the connector.

3. The teeth cleaning system of claim 2, wherein the handle assembly further includes:
   a second sleeve that extends outwardly from the casing,
      wherein the second sleeve houses a distal end of the shaft that is external to the casing, and
      wherein
         (i) the second sleeve is slidably engageable with the opening defined by the inner surface of the connector, and
         (ii) the distal end of the shaft is slidably engageable with the mating element.

4. The teeth cleaning system of claim 1, wherein the cam includes a projection that is receivable in a pocket along an inner surface of the sleeve.

5. The teeth cleaning system of claim 4,
   wherein as the cam rotates, the projection causes the sleeve to move laterally following a path of the cam rotation, and
   wherein the shaft moves laterally with the sleeve, thereby causing lateral movement of the tray assembly.

6. A teeth cleaning system comprising:
   a tray assembly that is configured to receive teeth of an upper jaw in an upper channel and teeth of a lower jaw in a lower channel;
   a connector that is coupled to an outer surface of the tray assembly and has an opening defined therein; and
   a handle assembly that includes:

a shaft that is slidably engageable with the opening of the connector,
a motor with a drive shaft that rotates during operation,
a cam to which the shaft and the drive shaft of the motor are coupled,
   wherein the cam is configured to drive the shaft in a lateral direction in response to being rotated by the drive shaft of the motor, and
multiple guide plates with apertures defined therein through which the shaft extends,
   wherein, each guide plate has an aperture that limits the range of movement in the lateral direction of a corresponding portion of the shaft.

7. A teeth cleaning system of claim 1 comprising:
a tray assembly that is configured to receive teeth of an upper jaw in an upper channel and teeth of a lower jaw in a lower channel,
   wherein the tray assembly has an arcuate form that is defined by an outer arcuate wall and an inner arcuate wall,
   wherein the upper and lower channels are defined by inner surfaces of the outer and inner arcuate walls and separated by a baffle that is positioned transversely across the inner surfaces of the outer and inner arcuate walls, and
   wherein one or more slots are defined through the inner surface of the outer arcuate wall and/or the inner surface of the inner arcuate wall to provide flex;
a connector that is coupled to an outer surface of the tray assembly and has an opening defined therein; and
a handle assembly that includes:
   a shaft that is slidably engageable with the opening of the connector,
   a motor with a drive shaft that rotates during operation,
   a cam to which the shaft and the drive shaft of the motor are coupled,
      wherein the cam is configured to drive the shaft in a lateral direction in response to being rotated by the drive shaft of the motor, and
   a guide plate with an aperture defined therein,
      wherein the shaft extends through the aperture such that a range of movement in the lateral direction is limited by a width of the aperture.

8. An oscillator assembly for oscillating a tray assembly of a teeth cleaning system, the oscillator assembly comprising:
   a shaft with a first end that is engageable with the tray assembly;
   a sleeve that houses a portion of the shaft; and
   a cam to which a second end of the shaft is coupled,
      wherein the cam includes a projection that is receivable in a pocket along an inner surface of the sleeve, and
      wherein when the cam is rotated by a drive shaft of a motor, engagement between the projection and the pocket causes lateral movement of the shaft.

9. The oscillator assembly of claim 8, wherein the shaft extends through an aperture in a guide plate that limits the lateral movement of the shaft.

10. A handle assembly for a teeth cleaning system that includes a tray assembly, the handle assembly comprising:
a casing with an opening defined therein;
a shaft that extends through the opening in the casing, such that a first end of the shaft is external to the casing and engageable with the tray assembly;
a sleeve that houses a portion of the shaft and has an inner surface that includes a pocket;
a motor with a drive shaft that rotates during operation; and
a cam to which a second end of the shaft is coupled,
   wherein the cam is configured to drive the shaft in a lateral direction in response to being rotated by the drive shaft of the motor.

11. The handle assembly of claim 10, further comprising:
a guide plate with an aperture defined therein,
   wherein the shaft extends through the aperture such that a range of movement in the lateral direction is limited by a width of the aperture.

12. The handle assembly of claim 11, wherein the aperture is formed to ensure that the shaft stays within a restricted path of motion.

13. The handle assembly of claim 11, wherein the aperture is one of multiple apertures in the guide plate, and wherein each of the multiple apertures is in the form of a slot that the shaft passes through.

14. The handle assembly of claim 10, further comprising:
a cover that is situated in the opening in the casing and prevents fluid from entering the casing.

15. The handle assembly of claim 10, further comprising:
a power source that provides power to the motor during operation.

16. The handle assembly of claim 10,
wherein the pocket is sized to receive a projection along an outer surface of the cam, and
wherein when the cam is rotated by the drive shaft of the motor, engagement between the projection and the pocket causes the sleeve to move laterally, thereby causing lateral movement of the shaft.

17. The handle assembly of claim 10, further comprising:
a button accessible along an outer surface of the casing that, when triggered, activates operation of the motor, so as to cause actuation of the tray assembly.

18. A handle assembly for a teeth cleaning system that includes a tray assembly, the handle assembly comprising:
a casing with an opening defined therein;
a shaft that extends through the opening in the casing, such that a first end of the shaft is external to the casing and engageable with the tray assembly;
a sleeve that extends outwardly from the casing, encircling the opening through which the shaft extends,
   wherein the sleeve and the first end of the shaft are separately engageable with the tray assembly;
a motor with a drive shaft that rotates during operation; and
a cam to which a second end of the shaft is coupled,
   wherein the cam is configured to drive the shaft in a lateral direction in response to being rotated by the drive shaft of the motor.

* * * * *